(12) United States Patent
Lee et al.

(10) Patent No.: US 11,739,406 B2
(45) Date of Patent: Aug. 29, 2023

(54) ALUMINUM SHEET MATERIAL FOR SEPARATOR OF FUEL CELL AND MANUFACTURING METHOD THEREFOR

(71) Applicants: HYUNDAI MOTOR COMPANY, Seoul (KR); KIA CORPORATION, Seoul (KR)

(72) Inventors: Tae Gyu Lee, Seoul (KR); Woong Pyo Hong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/376,673

(22) Filed: Jul. 15, 2021

(65) Prior Publication Data
US 2022/0195572 A1 Jun. 23, 2022

(30) Foreign Application Priority Data
Dec. 17, 2020 (KR) .......................... 10-2020-0177693

(51) Int. Cl.
*C22F 1/047* (2006.01)
*C22C 21/06* (2006.01)
*H01M 8/0208* (2016.01)

(52) U.S. Cl.
CPC .............. *C22F 1/047* (2013.01); *C22C 21/06* (2013.01); *H01M 8/0208* (2013.01)

(58) Field of Classification Search
None
See application file for complete search history.

(56) References Cited

U.S. PATENT DOCUMENTS

| | | | |
|---|---|---|---|
| 5,423,925 A | 6/1995 | Shoji et al. | |
| 2009/0071576 A1* | 3/2009 | Morishita | .......... B22D 11/0682 148/439 |
| 2019/0172487 A1 | 6/2019 | Kitawaki et al. | |

FOREIGN PATENT DOCUMENTS

| | | | | |
|---|---|---|---|---|
| CN | 107043877 A | * | 8/2017 | ........... B32B 15/016 |
| JP | H06-136497 A | | 5/1994 | |
| JP | 2013-501854 A | | 1/2013 | |
| KR | 10-0559831 B1 | | 3/2006 | |
| WO | 2011/037398 A2 | | 9/2010 | |

OTHER PUBLICATIONS

Olson, D.L. "ASM Handbook vol. 6: Welding, Brazing, and Soldering", ASM International, p. 312-314. (Year: 1993).*
Extended European Search Report dated Dec. 23, 2021, issued in corresponding European Patent Application No. 21186059.8.

* cited by examiner

*Primary Examiner* — George Wyszomierski
*Assistant Examiner* — Janell C Morillo
(74) *Attorney, Agent, or Firm* — Morgan, Lewis & Bockius LLP

(57) ABSTRACT

According to an embodiment, the aluminum sheet material for a separator of a fuel cell is used for forming a separator applied to a fuel cell stack and comprises 9-10 wt % of Mg; and the balance of Al and inevitable impurities, wherein the aluminum sheet material has cube texture and an R-cube texture formed therein. An aluminum sheet material for a separator in a fuel cell retains a thickness of 0.5 mm or less and exhibits excellent yield strength and elongation, and a manufacturing method therefor.

7 Claims, 4 Drawing Sheets

| | as-cast material | excluded material | rolled plate | sheet material | | | | |
|---|---|---|---|---|---|---|---|---|
| | | | | 200°C, 30min | 250°C, 30min | 300°C, 30min | 350°C, 30min | 400°C, 30min |
| grain size | 634.61μm | 50.85μm | 696.07μm | 432.84μm | 25.43μm | 25.52μm | 22.59μm | 24.31μm |
| texture | | | | | | | | |

ALUMINUM SHEET MATERIAL FOR SEPARATOR OF FUEL CELL AND MANUFACTURING METHOD THEREFOR

CROSS-REFERENCE TO RELATED APPLICATION

This application claims the benefit of priority to Korean Patent Application No. 10-2020-0177693, filed on Dec. 17, 2020, in the Korean Intellectual Property Office, the disclosure of which is incorporated herein by reference in its entirety.

TECHNICAL FIELD

The present disclosure relates to an aluminum sheet material for a separator in a fuel cell and a manufacturing method therefor, and more specifically, to an aluminum sheet material for a separator in a fuel cell.

BACKGROUND

A fuel cell is a type of generator unit which converts the chemical energy of a fuel into electrical energy through electrochemical reactions in a stack. Fuel cells may be used for commercial, industrial, and residential primary and backup power generation as well as being useful as power sources for compact electronic devices including electronic handheld devices. They are also used to power fuel cell vehicles. The fields in which fuel cells are available as clean energy sources have recently been expanded.

In a typical fuel cell stack, a membrane-electrode assembly (MEA) is at the innermost position of the fuel stack. A typical membrane-electrode assembly includes a polymer electrolyte membrane and two electrodes. The polymer electrolyte membrane allows protons to pass through and is sandwiched between the two electrodes, that is, a fuel electrode (anode) and an air electrode (cathode) which are coated with a catalyst to react hydrogen and oxygen.

In addition, a gas diffusion layer (GDL) is stacked on the outer surface of each of the fuel electrode and the air electrode. Separators in which flow fields are formed to discharge water generated by the reaction are respectively disposed on the outer surfaces of the gas diffusion layers, with end plates for supporting and fixing the components being coupled to the outermost side.

The separator is made of a metallic substance. During operation, a fuel cell generates water as a result of the reaction between hydrogen and oxygen. The generated water flows through the flow field formed in the separator and is discharged outside. The separator is thus fabricated with a stainless substance highly resistant to corrosion.

In order to make a fuel cell stack light, research into lightweight separators is ongoing. For example, research attention has been paid to aluminum as an alternative substance that can achieve the weight reduction while retaining the anti-corrosive property of stainless substances.

However, a separator has to retain yield strength, elongation, and corrosion resistance at some levels. A separator made of an aluminum substance, although achieving a necessary level in terms of corrosion resistance, can hardly meet necessary levels in terms of yield strength and elongation.

Moreover, a separator is typically required to have a thickness of 0.5 mm or less. An aluminum sheet material failing to meet the necessary yield strength and elongation is insufficient in formability and thus has a difficulty in being molded into a separator 0.5 mm or less in thickness.

The foregoing is intended merely to aid in the understanding of the background of the present disclosure, and is not intended to mean that the present disclosure falls within the purview of the related art that is already known to those skilled in the art.

SUMMARY

The present disclosure provides an aluminum sheet material for a separator of a fuel cell, which is obtained with modified alloy ingredients and manufacturing conditions and has excellent yield strength and elongation while retaining a thickness of 0.5 mm or less, and a manufacturing method therefor.

According to an aspect thereof, the present disclosure provides an aluminum sheet material for a separator of a fuel cell, the aluminum sheet material comprising: 9-10 wt % of Mg based on a total wt % of the aluminum sheet material; and a balance of Al and inevitable impurities, wherein the aluminum sheet material has a cube texture and a rotated cube texture therein.

The aluminum sheet material may further comprise either or both of 0.12 wt % or less of Mn and 0.12 wt % or less of Cr.

The aluminum sheet material may have a yield strength of 150 MPa or higher.

The aluminum sheet material may have an elongation of 28% or more.

The aluminum sheet material may have a thickness of 0.5 mm or less.

The aluminum sheet material may have $Al_3Mg_2$ formed as a precipitation phase therein.

According to another aspect thereof, the present disclosure provides a method for manufacturing an aluminum sheet material for a separator of a fuel cell, the method comprising the steps of: casting a molten metal containing 9-10 wt % of Mg and a balance of Al and inevitable impurities to prepare a rod-shaped as-cast material; cold rolling the as-cast material into a rolled plate; cold-pack rolling the rolled plate to prepare a sheet material, with multiple copies of the rolled plate being stacked; and thermally treating the sheet material.

In the casting step, the molten metal may further comprise either or both of Mn: 0.12 wt % or less of Mn and 0.12 wt % or less of Cr.

In the cold-pack rolling step, the rolled plate is rolled at a temperature of less than 100° C.

In the cold-pack rolling step, the rolled plate is rolled at room temperature.

In the cold-pack rolling step, the rolled plate is rolled to a thickness of 0.5 mm or less.

In the thermal treating step, the sheet material is thermally treated at 350-400° C. for 30-60 minutes.

The method may further comprise a step of extruding the as-cast material to prepare a plate-like extruded material between the casting step and the cold-rolling step, wherein the extruded material is cold rolled in the cold rolling step to prepare a rolled plate.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
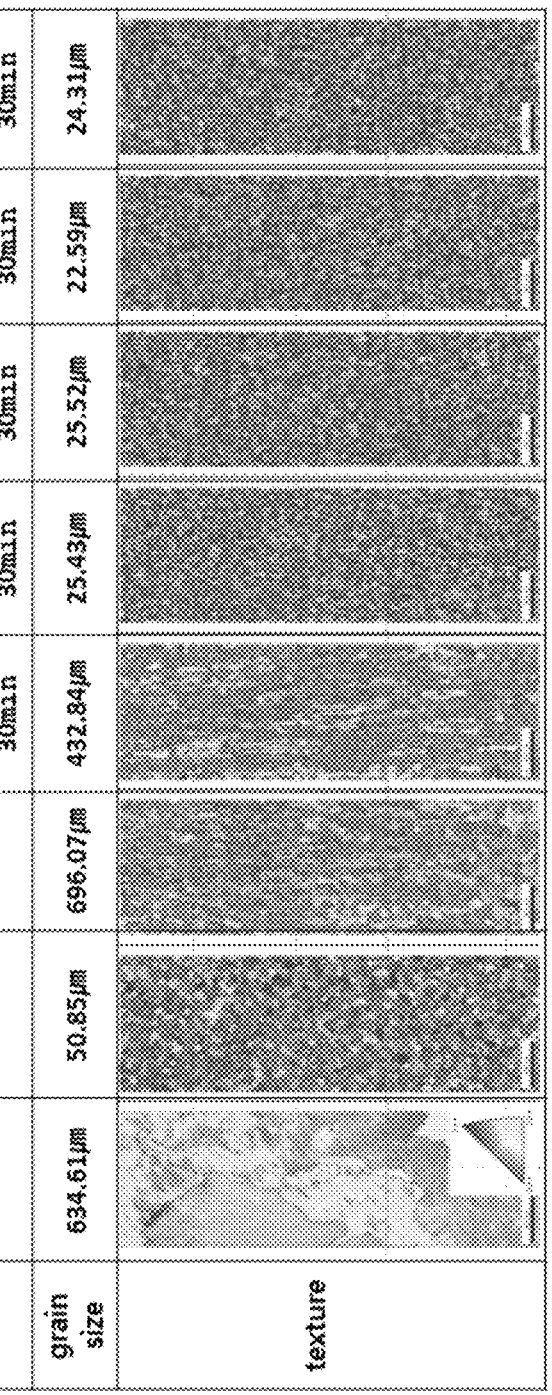
FIG. 1 shows changes in texture state according to manufacturing steps and thermal treatment conditions.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The aluminum sheet material for a separator of a fuel cell according to the present disclosure, which is used for forming a separator that is applied to a fuel cell stack, has a cube texture and a rotated cube (R-cube) texture formed therein by optimizing contents of main alloy components and thermal conditions, thereby exhibiting improved yield strength and elongation.

In detail, the aluminum sheet material comprises 9-10 wt % of Mg and a balance of Al and inevitable impurities. In an embodiment, the aluminum sheet material may further comprise either or both of: 0.12 wt % or less of Mn; and 0.12 wt % or less of Cr.

In the present disclosure, the reason why the alloy components and the amounts thereof are limited is as follows. Unless otherwise stated, "%", when representing the unit of amount of component, refers to "wt %".

Magnesium (Mg): 9-10%

Magnesium (Mg), which is a solid solution hardening element, interferes with dislocation and reduces stacking fault energy. Hence, the element obstructs dislocation cross slip and increases the work hardening exponent. As a result, the strength and the elongation are both increased with the decrease of local deformation. Too small a content of magnesium (Mg) brings about only a slight improvement in strength and elongation. Thus, magnesium is contained in an amount of 9% or higher.

When magnesium (Mg) is contained at a content of 9% or higher, the precipitation phase of $Al_3Mg_2$ appears. Through control of the generation of such precipitation phase, an improvement in strength and formability can be guaranteed. However, a magnesium (Mg) content exceeding 10% causes the problem of decreasing the elongation. Therefore, the content of magnesium (Mg) is limited to the range of 9-10%.

Manganese (Mn): 0.12% or Less

Manganese (Mn), which is an element enhancing processability at high temperatures, provokes the precipitation of fine dispersion phases and suppresses the growth of recrystallized grains upon homogenization to enhance processability. However, when the content of manganese (Mg) exceeds 0.12%, the dispersibility of the precipitation phases is lowered and micro cracks are generated around the crowded precipitation phases upon rolling. Thus, the content of manganese (Mn) is limited to up to 0.12%.

Chromium (Cr): 0.12% or Less

Chromium (Cr), which increases strength and deep drawing, forms a fine intermetallic compound to make grains fine. However, a content of chromium (Cr) exceeding 0.12% decreases the elongation with the increasing of yield strength. Thus, the content of chromium is limited to up to 0.12%.

Except the aforementioned ingredients, the rest is accounted for by aluminum and inevitable impurities.

Below, a description will be given of a method for manufacturing an aluminum sheet material having the composition for a separator of a fuel cell.

According to an embodiment thereof, the present disclosure provides a method for manufacturing an aluminum sheet material for a separator of a fuel cell, the method comprising the steps of: preparing a molten metal having the aforementioned composition; casting a molten metal to prepare a rod-shaped as-cast material; extruding the as-cast material into a plate-like extruded material; cold rolling the extrusion material into a rolled plate; cold-pack rolling the rolled plate to prepare a sheet material, with multiple copies of the rolled plate being stacked; and thermally treating the sheet material.

In an embodiment, the casting step, the extruding step, and the cold rolling step are carried out according to a typical manufacturing method for sheet materials. In this regard, the step of extruding the as-cast material may be omitted, but may be conducted in order to minimize pores and internal defects in the as-cast material.

However, after the rolled plate is prepared, the sheet material may be prepared by conducting cold-pack rolling, but not hot rolling, cold rolling, and cross rolling, which are conventionally used, in order to avoid a roll lifting phenomenon.

For example, when hot rolling is applied to the preparation of the sheet material, grains increase in size with increasing of the cycles of rolling, thus reducing the elongation.

When typical cold rolling is applied to the preparation of the sheet material, it may be difficult to make a sheet 0.5 mm or less in thickness due to a roll lifting phenomenon caused by a repulsive force of the substance.

In addition, when cross rolling is applied to the preparation of the sheet material, the elongation decreases as the size of the grains is excessively reduced by shear strain, with the resultant insignificant effect of formability.

In this embodiment, therefore, 4 to 6 copies of the rolled plate are stacked and rolled at 100° C. or less and preferably at room temperature to prepare a sheet material having a thickness of 0.5 mm or less, preferably 0.2 mm or less.

In the thermal treating method, limitation is made of the thermal treatment temperature is limited to the range of 350° C.-400° C. and thermal treatment time is limited to the range of 30-60 minutes in order to control the growth of grains and textures. When the thermal treatment temperature and time are deviated from the condition, a desired pattern of textures is not formed, or desired strength and elongation cannot be obtained because grains increase.

Hereinafter, the present disclosure is explained with reference to Examples and Comparative Examples.

The molten metals produced with various contents of components as shown in Table 1, below, were subjected to extrusion, cold rolling, cold-pack rolling, and thermal treatment.

In detail, the molten metals with various contents of the components as in Table 1 were cast and the as-cast materials were extruded and cold rolled. Four copies of the rolled plate in a sheet form were stacked and subjected cold-pack rolling. In this regard, the rolling was conducted 8 times to afford a sheet material 0.2 mm thick.

The 0.2-mm-thick sheet material thus prepared was thermally treated at 350° C. for 60 min and then measured for yield strength, tensile strength, and elongation. The results are summarized in Table 1.

TABLE 1

| Ex. # | Mg | Mn | Cr | Yield Strength | Tensile Strength | Elongation |
|---|---|---|---|---|---|---|
| C. Example 1 | 6 | — | — | 128.2 | 302.5 | 20.7 |
| C. Example 2 | 7 | — | — | 146.1 | 323.4 | 24.1 |
| C. Example 3 | 8 | — | — | 158.2 | 345.0 | 23.4 |
| Example 1 | 9 | — | — | 157.1 | 362.8 | 30.4 |
| Example 2 | 10 | — | — | 159.3 | 369.3 | 31.7 |
| C. Example 4 | 2 | 0.12 | 0.12 | 61.9 | 168.8 | 17.5 |
| C. Example 5 | 4 | 0.12 | 0.12 | 116.9 | 244.7 | 21.3 |
| C. Example 6 | 5 | 0.12 | 0.12 | 146.5 | 301.8 | 25.0 |
| C. Example 7 | 6 | 0.12 | 0.12 | 162.5 | 315.7 | 25.3 |
| C. Example 8 | 7 | 0.12 | 0.12 | 150.0 | 346.7 | 25.6 |
| C. Example 9 | 8 | 0.12 | 0.12 | 175.3 | 382.5 | 27.7 |
| Example 3 | 9 | 0.12 | 0.12 | 166.7 | 361.2 | 30.2 |
| Example 4 | 10 | 0.12 | 0.12 | 174.5 | 377.9 | 31.3 |
| C. Example 10 | 12 | 0.12 | 0.12 | 160.5 | 343.5 | 27.8 |

As is understood from the data of Table 1, the sheet materials of the Examples which met kinds and contents of the alloy components proposed in the present disclosure all exhibited a yield strength of 150 MPa or higher, a tensile strength of 360 MPa or higher, and an elongation of 28% or higher.

Particularly, Examples 3 and 4, which contained Mn and Cu, were superior in terms of yield strength and elongation to Examples 1 and 2, which do not contain Mn and Cu.

In addition, Comparative Examples 1, 2, 4, 5, and 6, which included Mg at a content less than that proposed in the present disclosure, were observed to be lower in all yield strength, tensile strength, and elongation, compared to the Examples.

Comparative Examples 3 and 9, which had a Mg content slightly lower than that proposed in the present disclosure, exhibited higher yield strength and tensile strength, but lower elongation than the Examples.

Furthermore, Comparative Example 10 that had a Mg content higher than that proposed in the present disclosure exhibited yield strength similar to or higher than those of the Examples, but was rather lower in elongation than the Examples.

Next, experiments were conducted to examine grain sizes, texture formation, and formability (LDH) according to thermal treatment conditions for the sheet material.

Sheet materials having the composition of Example 4 in Table 1 were prepared and subjected to thermal treatment as indicated in Table 2. The specimens thus obtained were measured for grain size, texture state, and formability and the results are summarized in Table 2 and depicted in FIGS. 1 and 2.

Figure 2:
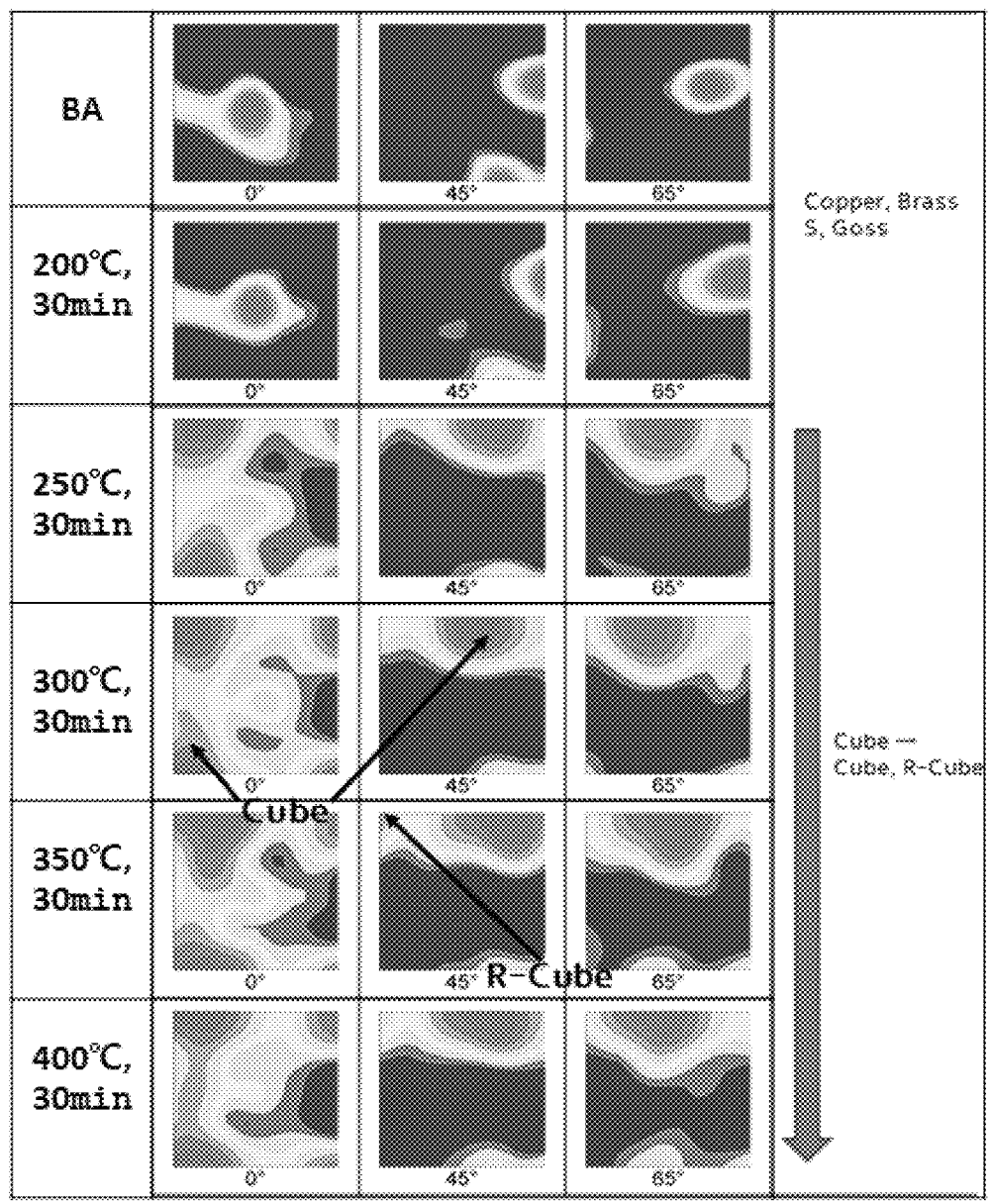
FIG. 2 shows orientation distribution function analysis results according to thermal treatment conditions.

FIG. 1 shows texture states according to manufacturing steps and thermal treatment conditions, and FIG. 2 shows orientation distribution function analysis results according to thermal treatment conditions.

TABLE 2

| | | Thermal treatment condition | | | | | |
|---|---|---|---|---|---|---|---|
| | BA | 200° C. 30 min | 250° C. 30 min | 300° C. 30 min | 350° C. 30 min | 400° C. 30 min | 400° C. 120 min |
| Texture | | Copper, Brass, S, Goss | | Cube | | Cube, R-Cube | Cube, R-Cube |
| Formability (LDH) | 3.1 mm | 4.2 mm | 6.5 mm | 7.0 mm | 7.3 mm | 7.4 mm | — |

As shown in FIG. 1, the thermal treatment made the grains fine to the level as small as 22-25 μm.

From the data of Table 2 and FIG. 2, the thermal treatment induced the formation of cube texture and R-cube (rotated cube) texture, leading to increasing the elongation and enhancing the formability.

At a temperature lower than that proposed herein, however, grains were neither made fine, nor was R-cube (rotated cube) formed.

In addition, a thermal treatment time longer than that proposed herein decreased the elongation rather, and thus deteriorated the formability.

Figure 3A:
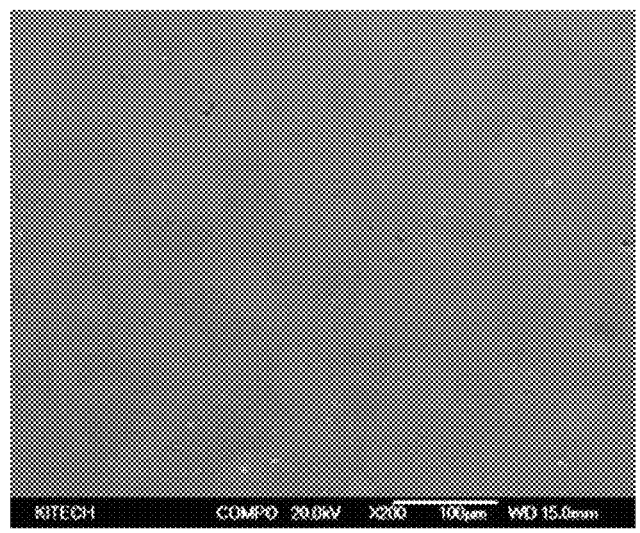
FIG. 3A is an electron microscopic image of the specimen of Comparative Example 1 in Table 1.
Figure 3B:
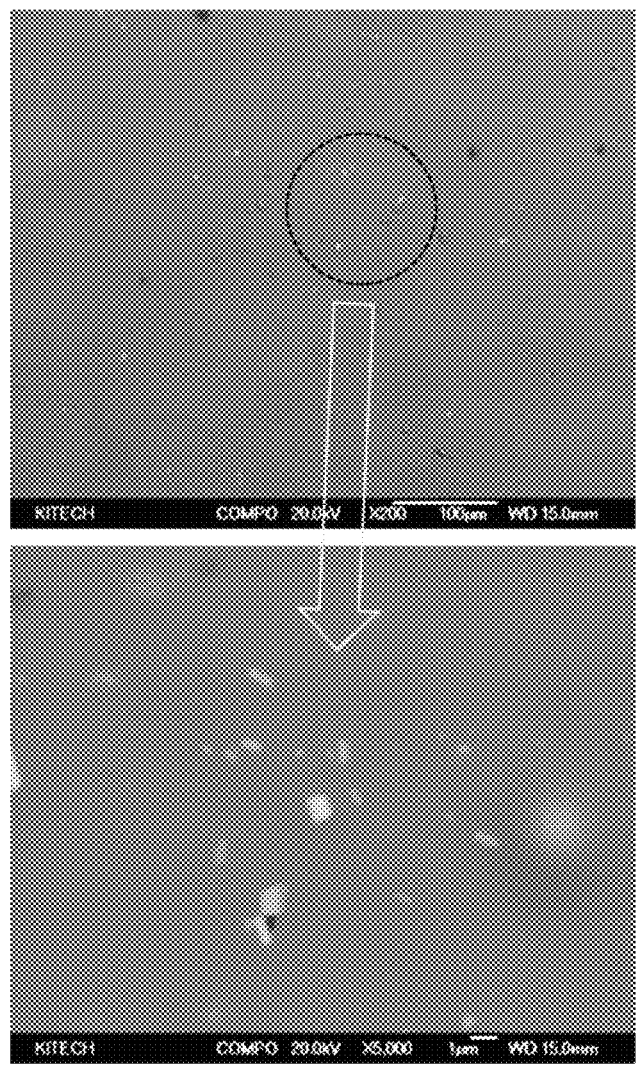
FIG. 3B is an electron microscopic image of the specimen of Example 1 in Table 1.

FIGS. 3A and 3B are electron microscopic images of the specimens of Comparative Example 1 and Example 1 in Table 1, respectively.

As shown in FIG. 3A, the formation of precipitates did not occur for Comparative Example 1.

In contrast, precipitates were observed and identified as $Al_3Mg_2$ as shown in FIG. 3B.

Therefore, it was found that $Al_3Mg_2$ precipitated in the atomic solution with the increase of Mg content, contributing to an improvement in strength and formability.

Although the exemplary embodiments of the present invention have been disclosed for illustrative purposes, those skilled in the art will appreciate that various modifications, additions and substitutions are possible, without departing from the scope of the accompanying claims.

As described hitherto, according to an embodiment of the present disclosure, an aluminum-based separator superior in terms of yield strength and elongation can be manufactured and used, in substitution for stainless steel-based separator, in fuel cell stacks, thus making the fuel cell stacks light without a functional decrease in the fuel cell stacks.

What is claimed is:

1. A method for manufacturing an aluminum sheet material for a separator of a fuel cell, the method comprising steps of:
   casting a molten metal, which contains 9-10 wt % of Magnesium (Mg), based on a total wt % of the molten material, a balance of Aluminum (Al) and inevitable impurities, to prepare a cast material having a rod shape;
   cold rolling the cast material into a rolled plate;
   stacking multiple copies of the rolled plate to form a stacked rolled plate product;
   cold-pack rolling the stacked rolled plate product to prepare a sheet material; and
   thermally treating the sheet material.

2. The method of claim 1, wherein, in the casting step, the molten metal further comprises at least one of 0.12 wt % or less of Manganese (Mn) or 0.12 wt % or less of Chromium (Cr), based on the total wt % of the molten material.

3. The method of claim 1, wherein, in the cold-pack rolling step, the stacked rolled plate product is rolled at a temperature of less than 100° C.

4. The method of claim 3, wherein, in the cold-pack rolling step, the stacked rolled plate product is rolled at room temperature.

5. The method of claim 3, wherein, in the cold-pack rolling step, the stacked rolled plate product is rolled to a thickness of 0.5 mm or less.

6. The method of claim 1, wherein, in the thermal treating step, the sheet material is thermally treated at 350-400° C. for 30-60 minutes.

7. A method for manufacturing an aluminum sheet material for a separator of a fuel cell, the method comprising steps of:
- casting a molten metal, which contains 9-10 wt % of Magnesium (Mg), based on a total wt % of the molten material, a balance of Aluminum (Al) and inevitable impurities, to prepare a cast material having a rod shape;
- extruding the cast material to prepare an extruded material having a plate shape;
- cold rolling the extruded material into a rolled plate;
- stacking multiple copies of the rolled plate to form a stacked rolled plate product;
- cold-pack rolling the stacked rolled plate product to prepare a sheet material; and
- thermally treating the sheet material.

\* \* \* \* \*